US006515830B1

(12) United States Patent
Meguro

(10) Patent No.: US 6,515,830 B1
(45) Date of Patent: Feb. 4, 2003

(54) PROTECTIVE LINEAR SHEETS FOR A MAGNETIC RECORDING DISC HOUSED IN A DISC CARTRIDGE

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 5 days.

(21) Appl. No.: 09/655,359

(22) Filed: Sep. 5, 2000

(30) Foreign Application Priority Data

Sep. 6, 1999 (JP) .......................................... 11-252329

(51) Int. Cl.⁷ ............................................. G11B 23/03
(52) U.S. Cl. ...................................................... 360/133
(58) Field of Search ......................................... 360/133

(56) References Cited

U.S. PATENT DOCUMENTS

| | | | |
|---|---|---|---|
| 3,668,658 A | | 6/1972 | Flores et al. ........... 340/174.1 C |
| 3,947,893 A | | 3/1976 | Hall, Sr. ..................... 360/133 |
| 4,419,164 A | * | 12/1983 | Martinelli ................... 360/133 |
| 4,911,301 A | | 3/1990 | Dieffenbach ................ 206/444 |
| 5,506,740 A | * | 4/1996 | Harmon ...................... 360/133 |
| 5,526,337 A | | 6/1996 | Housey et al. .............. 369/103 |
| 5,969,917 A | * | 10/1999 | Iwaki ......................... 360/133 |
| 6,021,030 A | * | 2/2000 | Weinberger et al. ........ 360/133 |
| 6,108,298 A | * | 8/2000 | Miyazaki et al. ........... 369/291 |
| 6,134,082 A | * | 10/2000 | Uwabo et al. .............. 360/133 |
| 6,198,598 B1 | * | 3/2001 | Meguro ...................... 360/133 |
| 6,274,844 B1 | * | 8/2001 | Beuch et al. .......... 219/121.64 |
| 6,298,034 B1 | * | 10/2001 | Hashimoto .................. 369/291 |
| 6,307,831 B1 | * | 10/2001 | Miyazaki et al. ........... 369/291 |

FOREIGN PATENT DOCUMENTS

| | | |
|---|---|---|
| DE | 295 00 045 | 8/1995 |
| JP | 61 039279 | 2/1986 |
| JP | 10-289553 | * 10/1998 |
| WO | WO 97 21219 | 6/1997 |

OTHER PUBLICATIONS

Patent Abstracts of Japan, vol. 010, No. 195 (P–475), Jul. 9, 1986.

* cited by examiner

Primary Examiner—Jefferson Evans
(74) Attorney, Agent, or Firm—Frommer Lawrence & Haug LLP; William S. Frommer; Matthew K. Ryan

(57) ABSTRACT

A main cartridge body unit is to be reduced in size and thickness to reliably protect a disc-shaped recording medium. To this end, a disc cartridge includes a disc-shaped recording medium 5, a main cartridge body unit 6 including an upper plate 21 and a lower plate 22, both of a metal material, forming a plate pair, and an intermediate frame 23, sandwiched between the upper and lower plates 21, 22, and an upper liner sheet 101 and a lower liner sheet 110, forming a set of liner sheets, bonded to inner surfaces of the upper and lower plates 21, 22 for protecting the disc-shaped recording medium 5. The disc-shaped recording medium 5 is accommodated in the main cartridge body unit 6.

5 Claims, 20 Drawing Sheets

PROTECTIVE LINEAR SHEETS FOR A MAGNETIC RECORDING DISC HOUSED IN A DISC CARTRIDGE

BACKGROUND OF THE INVENTION

1. Field of the Invention

This invention relates to a disc cartridge having a disc-shaped recording medium, such as a magnetic disc, accommodated therein.

2. Description of Related Art

There has so far been known a disc cartridge having a flexible magnetic disc with a diameter of, for example, 3.5 inch, accommodated therein as a disc-shaped recording medium. This disc cartridge has a main cartridge body portion including a set of shells, that is an upper shell and a lower shell, combined together. These upper and lower shells are formed of a resin material, and are provided with recording and/or reproducing apertures for exposing a portion of the flexible magnetic disc to outside across its inner and outer rims. On the main cartridge body portion is mounted a shutter member for opening/closing the recording and/or reproducing apertures. Within the main cartridge body unit, there are provided an upper liner sheet and a lower liner sheet, forming a liner sheet set, for protecting the flexible magnetic disc. These upper and lower liner sheets are welded and bonded to the inner surfaces of the upper and lower shells.

In the conventional disc cartridge of the above-described type, a shutter member is moved on loading the disc cartridge in a recording and/or reproducing apparatus so that its recording and/or reproducing aperture is opened. As the flexible magnetic disc is run in rotation, the information is recorded and/or reproduced by a magnetic head intruded through the recording and/or reproducing aperture.

Recently, in a portable electronic equipment, such as a portable computer or a digital still camera, a demand is raised for a recording and/or reproducing apparatus that is able to handle the information of a larger volume, and for a information recording medium used for this recording and/or reproducing apparatus.

As for an information recording medium, used for this sort of the recording and/or reproducing apparatus, it is proposed to reduce the size or thickness of a disc cartridge having the flexible magnetic disc housed therein.

Meanwhile, if it is desired in the above-mentioned conventional disc cartridge to reduce the size or thickness of the main cartridge body portion, it is retained to be difficult to realize a reduced thickness because the main cartridge body unit is formed of synthetic resin. It is necessary to maintain the thickness of the disc cartridge of the order of 0.3 mm at a minimum even if importance is not attached to the mechanical strength or deformation such as warping of the major surfaces of the upper or lower shell.

If it is necessary to secure the mechanical strength of the main cartridge body portion, it is necessary to increase the thickness of the upper and lower shells further, so that a problem is presented that it is extremely difficult to fabricate the main cartridge body unit designed to cope with a flexible magnetic disc with a thickness of the order of 2 inch solely from a resin material.

In order to reduce the thicknesses of the upper and lower shells of the main cartridge body unit, it may be contemplated to form the upper and lower shells from a metallic material.

In this disc cartridge, it is necessary to provide upper and lower liner sheets for protecting the flexible magnetic disc. However, since it is impossible to weld the upper and lower shells of metal, it is difficult to bond the upper and lower liner sheets to the inner surfaces of the upper and lower shells of metal.

SUMMARY OF THE INVENTION

It is therefore an object of the present invention to provide a disc cartridge in which the main cartridge body unit can be reduced in size and thickness and in which the disc-shaped recording medium can be protected reliably.

For accomplishing the above object, the present invention provides a disc cartridge including a disc-shaped recording medium, a main cartridge body unit including an upper plate and a lower plate, both of a metal material, forming a plate pair, and an intermediate frame, sandwiched between the upper and lower plates, and a set of protective members bonded to inner surfaces of the upper and lower plates for protecting the disc-shaped recording medium. The disc-shaped recording medium is accommodated in the main cartridge body unit.

In the present disc cartridge, in which a set of protective members are bonded to the inner surfaces of the upper and lower plates via adhesive layers, the protective members may be provided readily.

DESCRIPTION OF THE PREFERRED EMBODIMENTS

Figure 1:
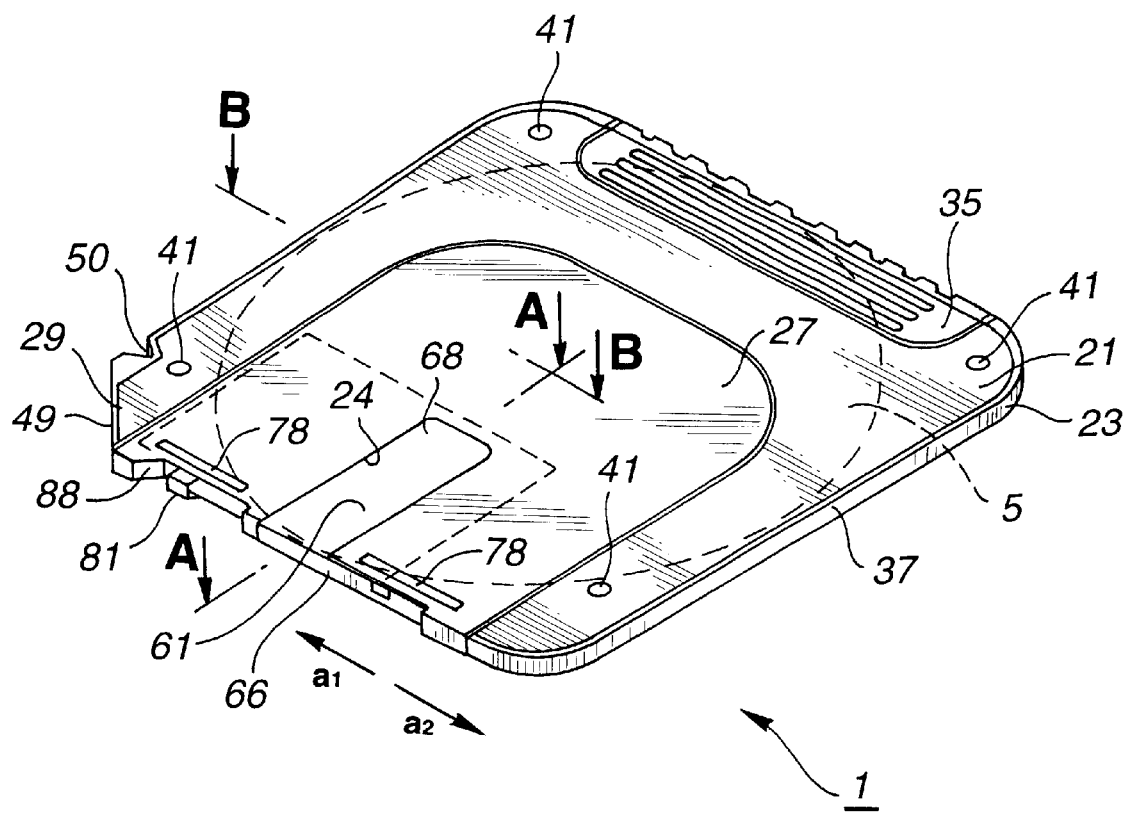
FIG. 1 is a perspective view showing a disc cartridge according to the present invention.

Referring to the drawings, preferred embodiments of according to the present invention will be explained in detail. The disc cartridge according to the present invention is applied to a card type disc drive device loaded in a PC card slot in which can be mounted or dismounted a PC card of the PCMCIA (Personal Computer Memory Card International Association) standard, such as an IC (Integrated Circuit) memory card provided on a notebook type personal computer, or a FAX modem card. On the other hand, disc drive device is adapted to the PC card slot of TYPE II (Release 2.1).

Figure 2:
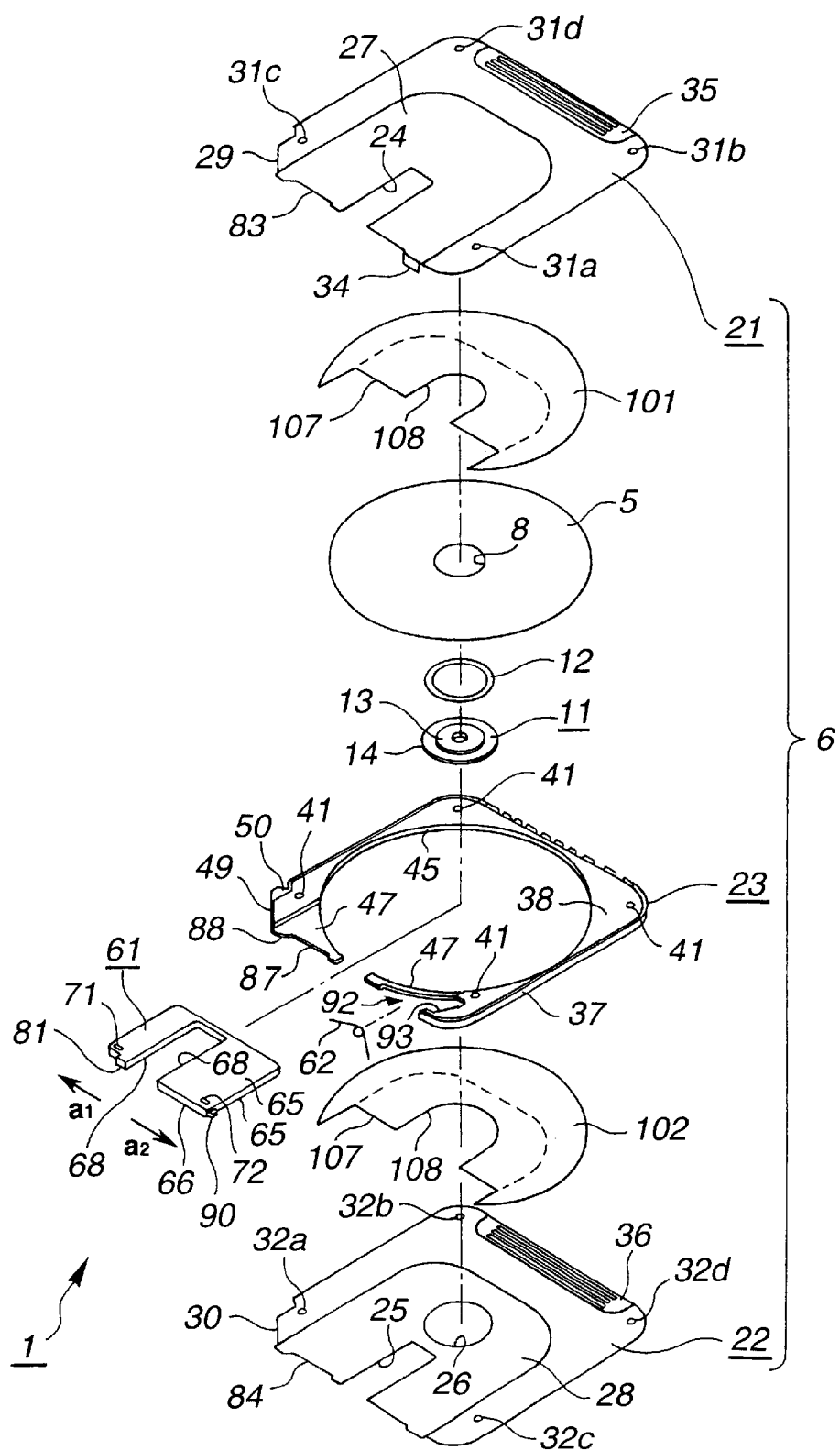
FIG. 2 is an exploded perspective view showing the disc cartridge.

Referring to FIGS. 1 and 2, the disc cartridge 1 includes a flexible magnetic disc 5, and a main cartridge body unit 6 adapted for rotationally accommodating this flexible magnetic disc 5.

Figure 3:
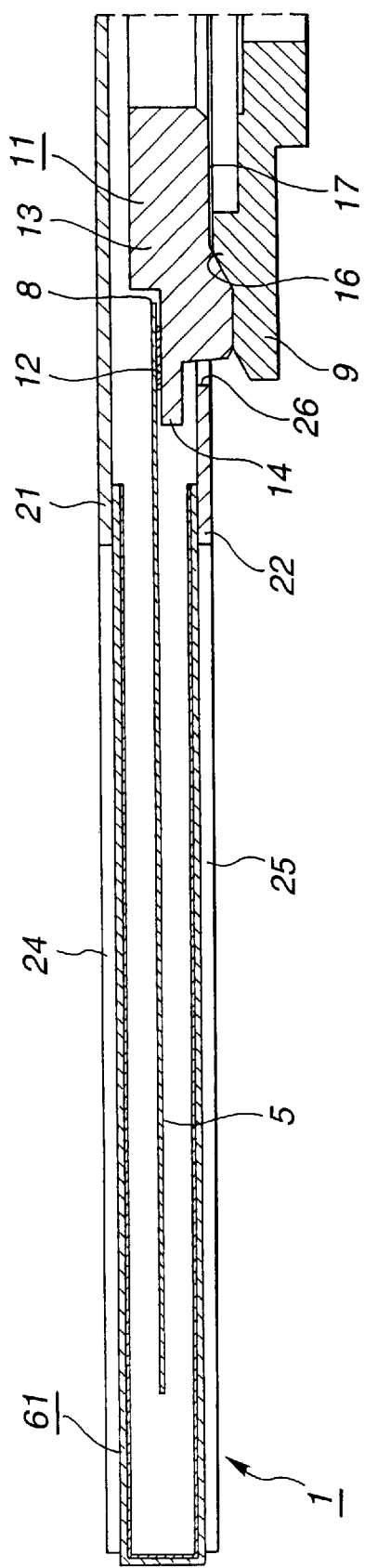
FIG. 3 is a cross-sectional view of a flexible magnetic disc of FIG. 1, taken along line A—A of FIG. 1.

Referring to FIGS. 2 and 3, the flexible magnetic disc 5 is formed by a sheet of e.g., polyester, to the shape of a disc having a center opening 8, and has its both surfaces coated with a magnetic material. The flexible magnetic disc 5 is formed to be e.g., of a diameter of 2 inch and to have a recording capacity of the order of approximately 150 MB (megabytes). This flexible magnetic disc 5 is rotationally driven at, for example, an rpm of 3600.

Referring to FIGS. 2 and 3, a center hub 11, adapted to rest on a disc table 9 of a disc rotating driving mechanism on the disc driving device, is mounted with an adhesive layer 12 in the center aperture 8 of the flexible magnetic disc 5. The center hub 11 is formed of a magnetic metal material and, as shown in FIGS. 2 and 3, includes a substantially cylindrical center portion 13, adapted to rest on the disc table 9, and a flange portion 14, formed integrally with the outer periphery of the center portion 13 and which is adapted for being fitted on the inner rim of the center opening 8 of the flexible magnetic disc 5. The center portion 13 of the center hub 11 is formed integrally with an engagement recess 17 engaged by an engagement projection 16 formed on the disc table 9 of the disc drive device.

The main cartridge body unit 6 has an upper plate 21, a lower plate 22 and an intermediate frame 23 sandwiched between the upper and lower plates 21, 22, as shown in FIG. 2.

Figure 4:
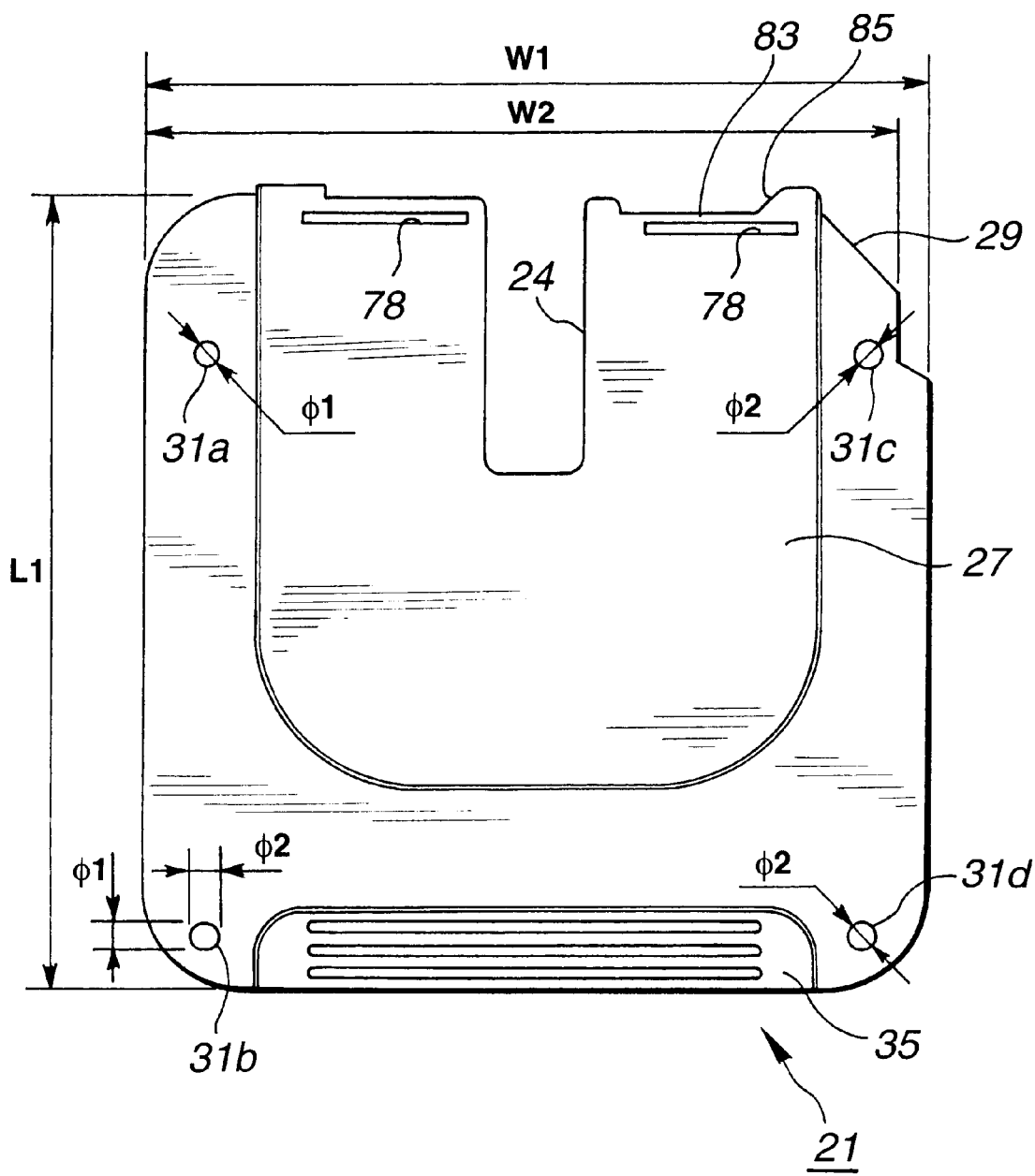
FIG. 4 is a plan view showing an upper plate.
Figure 5:
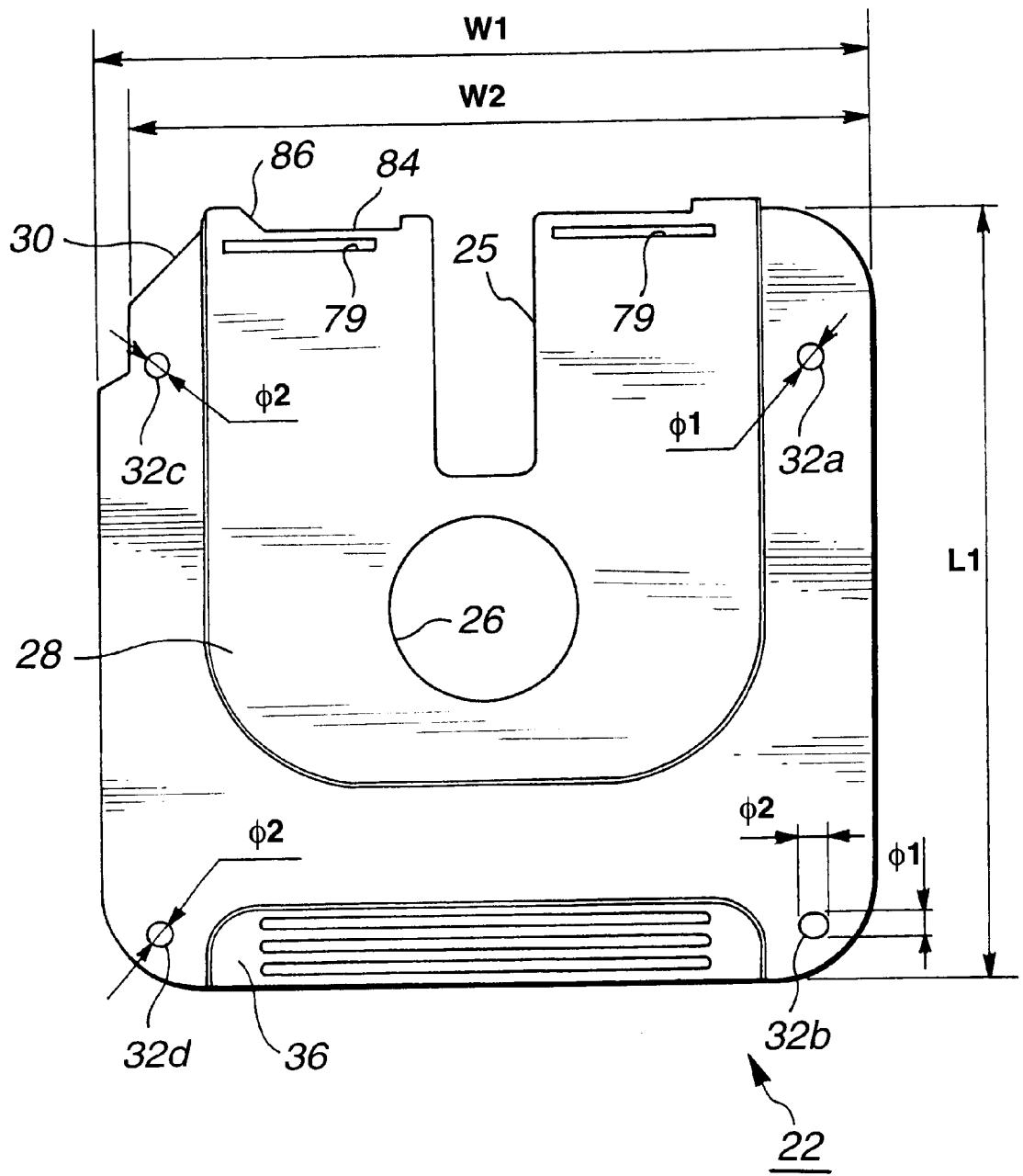
FIG. 5 is a plan view showing a lower plate.

As shown in FIGS. 4 and 5, the upper and lower plates 21, 22 are formed of a metal material, such as a stainless steel material, to a substantially square flat plate, and is of a thickness of the order of 0.2 mm.

As shown in FIGS. 4 and 5, the upper and lower plates 21, 22 are formed with substantially rectangular recording and/or reproducing apertures 24, 25, at the front end sides thereof in the inserting/ejection direction with respect to the disc drive device, for exposing portions of the recording area of the flexible magnetic disc 5 to outside across the inner and outer rims of the disc, so that the apertures 24, 25 face each other. The front end sides of the upper and lower plates 21, 22 in the inserting/ejection direction with respect to the disc drive device are referred to below simply as the front end sides. These recording and/or reproducing apertures 24, 25 are formed for being opened in the front ends of the upper and lower plates 21, 22.

Centrally of the lower plate 22 is formed a circular opening 26 for rotationally driving the flexible magnetic disc 5. The circular opening 26 is adapted for permitting the disc table 9 of the disc rotating driving mechanism of the disc drive device to be intruded into the interior of the main cartridge body unit 6, as shown in FIG. 5. This rotationally driving opening 26 has its inner diameter smaller than the outer diameter of the flange 14 of the center hub 11 of the flexible magnetic disc 5.

Figure 6:
FIG. 6 is a side view of the disc cartridge.

Referring to FIGS. 4 to 6, the upper and lower plates 21, 22 are formed with substantially rectangular thickened portions 27, 28, respectively, these thickened portions including shutter sliding areas in which a shutter member 61 arranged towards the inner sides of the upper and lower plates 21, 22 as later explained is adapted for being slid and which is extended from the front sides towards mid portions of the upper and lower plates 21, 22.

With these thickened portions 27, 28, a sufficient gap is maintained between the shutter member 61 and the inner surfaces of the upper and lower plates 21, 22, thus assuring an optimum operation of the shutter member 61 adapted for being slid on the inner sides of the upper and lower plates 21, 22. With these thickened portions 27, 28, the upper and lower plates 21, 22 can be prevented from being flexed in the direction of thickness to improve mechanical strength.

Stated differently, the disc cartridge 1 has a thickness of its area other than the thickened portions 27, 28 having the shutter sliding area thinner than that of the thickened portions 27, 28 to permit the flexible magnetic disc 5 to be rotated in stability.

That is, the disc cartridge 1 is rotationally driven at, for example, an rpm of 3600, higher than the rotational speed of 3000 rpm, retained to be a higher speed, so that, under the Bernoulli's law, an air stream is produced in a gap defined between the upper and lower plates 21, 22 and the rotationally driven flexible magnetic disc 5, thus producing a negative pressure to maintain a balanced state between the upper and lower plates 21, 22 and the flexible magnetic disc 5.

By the flexible magnetic disc 5 being rotationally driven under this negative pressure state, the flexible magnetic disc 5 is maintained in a flat position without producing positional deviation or oscillations on the recording surface. Thus, whilst it is necessary to stabilize the air stream and to maintain a constant gap between the recording surface of the flexible magnetic disc 5 and the inner surfaces of the upper and lower plates 21, 22, in order to stabilize the flexible magnetic disc 5 rotating at an elevated speed and the air stream, higher stability may be achieved when the gap is smaller in size. So, by the main cartridge body unit 6 having a uniform thin thickness in areas other than the thickened portions 27, 28 having the shutter sliding area, the gap magnitudes on the air inlet and outlet sides on both sides of the magnetic head are rendered equal to each other to permit the flexible magnetic disc 5 to be rotated in stability at an elevated speed.

The upper and lower plates 21, 22 are formed integrally with cut-outs 29, 30, cut at an inclined angle of e.g., approximately 45° relative to the disc inserting/ejecting direction, as shown in FIGS. 4 and 5. By these cut-outs 29, 30, it is possible to evade the disc cartridge 1 from compressing against shutter operating means provided on the disc drive device for acting on the shutter member 61 when the disc cartridge 1 is loaded on the disc drive device. It is noted that the other corners of the upper and lower plates 21, 22 are arcuate in profile.

Referring to FIGS. 4 and 5, the upper plate 21 and the lower plate 22 are provided with first to fourth engagement openings 31a to 31d and 32a to 32d, respectively, in the vicinity of respective corners thereof, for being engaged in position relative to the intermediate frame 23. Referring to FIGS. 4 and 5, the first engagement openings 31a and 32a operate as reference openings used for positioning the upper and lower plates 21, 22 at pre-set positions on the intermediate frame 23. The second engagement openings 31b, 32b are elliptically-shaped and serve as position adjustment holes that may be adjusted in the long-axis direction relative to the intermediate frame 23. The third and fourth engagement openings 31c, 31d, 32c, 32d are coupling openings for coupling to the intermediate frame 23.

The front end side of the upper plate 21 is bent to form an abutment piece 34, as shown in FIG. 2. This abutment piece 34 is adapted to bear against the front end of the lower plate 22 when the upper plate 21 is combined with the lower plate 22 with the intermediate frame 23 in-between.

Referring to FIGS. 4 to 6, the upper plate 21 and the lower plate 22 are formed integrally with finger supports 35, 36 as thickened portions serving as an aid for a user to hold the main cartridge body unit 6 at finger's ends. These finger supports 35, 36 are provided close to the trailing ends in the inserting/ejecting directions of the plates to or from the disc drive device. These finger supports 35, 36 are formed integrally with plural anti-slip linear grooves for the holding finger ends, with the grooves extending parallel to the width-wise direction of the main cartridge body unit 6.

The intermediate frame 23 is formed as a substantially flat plate from a resin material, such as nylon 6, PPS (polyphenylene sulfide) or polycarbonate.

Figure 7:
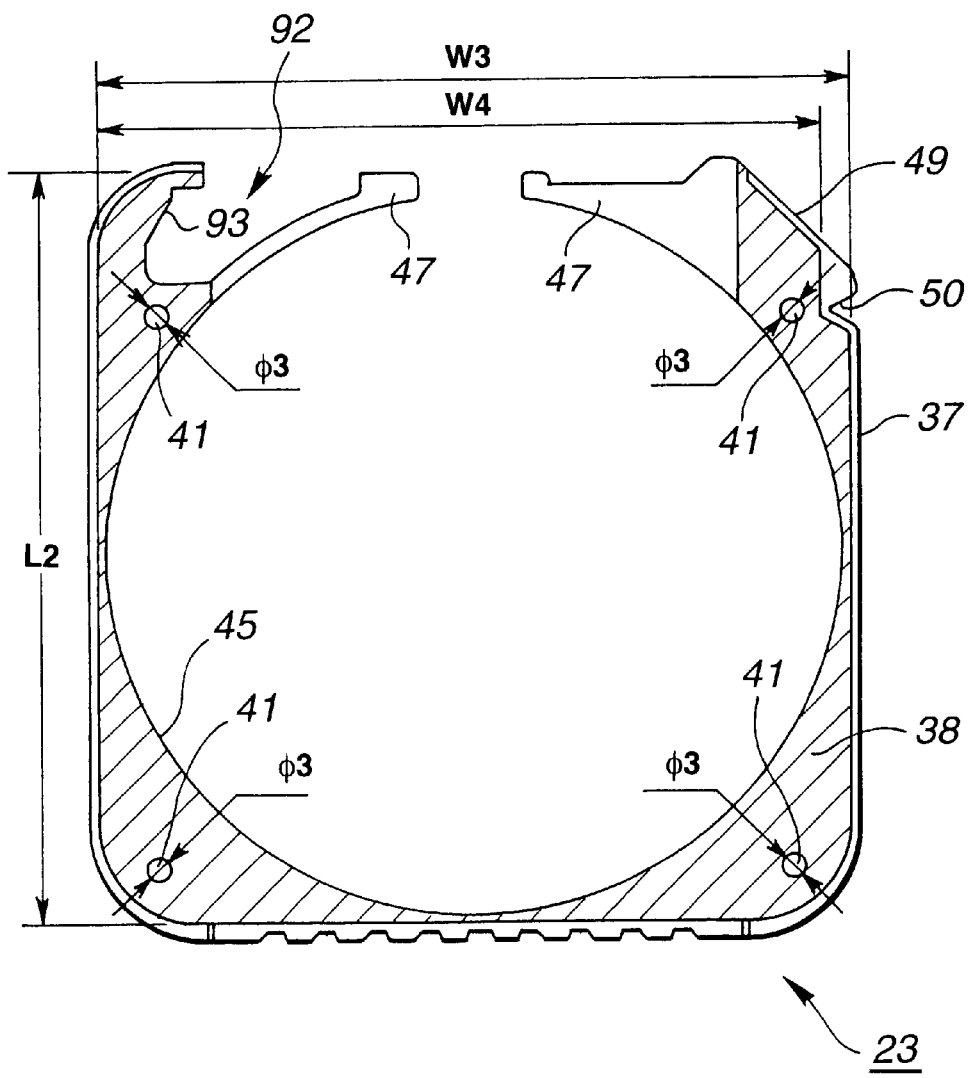
FIG. 7 is a plan view showing an intermediate plate.

The intermediate frame 23 is formed to a size slightly larger than the outer size of the upper plate 21 or the lower plate 22, as shown in FIG. 7. The intermediate frame 23 has a protrusion 37 along its outer perimetrical portions except its portions in register with the front end sides of the upper and lower plates 21, 22 corresponding to the shutter sliding portions. The protrusion 37 is projected in a direction parallel to the major surfaces of the upper and lower plates 21, 22.

The intermediate frame 23 is formed integrally with connection recesses 38, 38 on its both surfaces, as shown shaded in FIG. 7. In these connection recesses 38, 38 are mounted the upper plate 21 and the lower plate 22. Referring to FIG. 4, if the outer sizes of the upper plate 21 and the lower plate 22 are such that the lengths are equal and L2 and the widths thereof are equal and W1 and W2, and the corresponding sizes of the connection recesses 38, 38 are such that the length is L2 and the widths are W3 and W4, the relationship of L2>L1, W1>W3 and W2>W4 holds. Meanwhile, a dimensional difference α is such that $$L2-L1=W1-W3=W2-W4=\alpha \quad (1).$$

Figure 8:
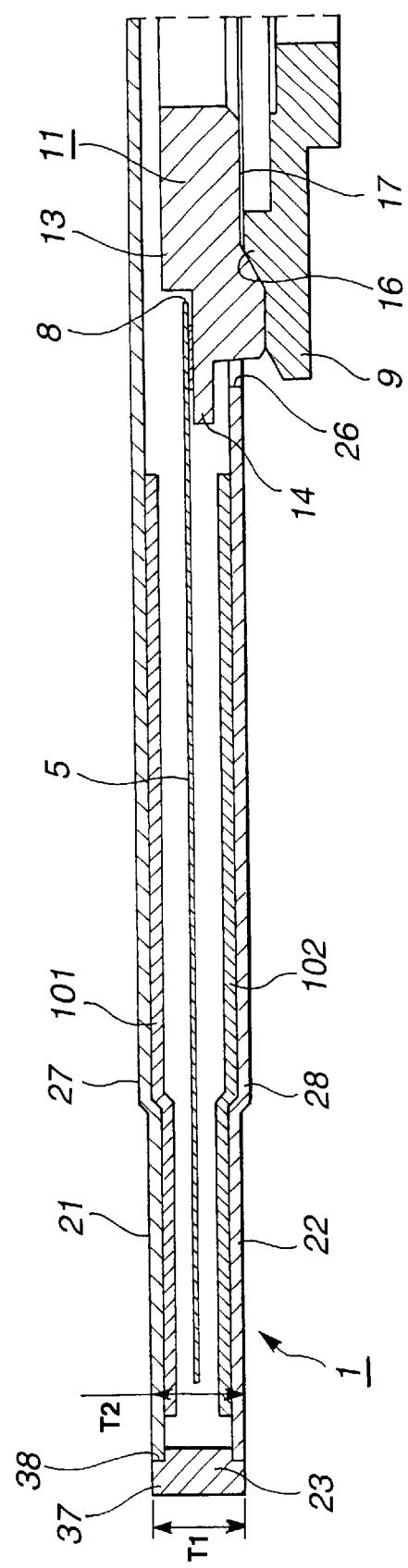
FIG. 8 is a cross-sectional of the intermediate frame of FIG. 1, taken along line B—B in FIG. 1.
Figure 9:
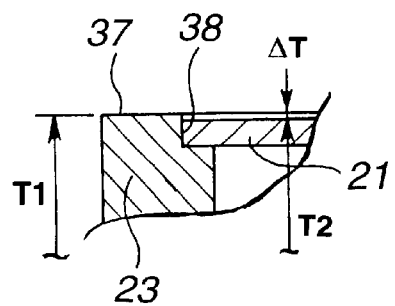
FIG. 9 is a cross-sectional view for illustrating essential portions of the intermediate frame.

The connection recess 38 is adapted for being of a depth slightly larger than the thickness of the upper plate 21 or the lower plate 22, as shown in FIGS. 8 and 9. Therefore, the protrusion 37 of the intermediate frame 23 is protruded slightly in a direction perpendicular to the major surfaces of the upper and lower plates 21, 22, as shown in FIG. 9.

As a result, outer peripheral edges of the upper plate 21 or the lower plate 22, mounted within the connection recess 38, are not protruded outwards, so that there is no risk of the finger ends of the user touching the protruded edges, thus assuring sufficient operational safety.

Referring to FIG. 9, if, in the main cartridge body unit 6 in which the upper plate 21 and the lower plate 22 are bonded within the connection recesses 38, 38 of the intermediate frame 23, the thickness as measured at the protrusion 37 of the intermediate frame 23, lying at an end of the main cartridge body unit 6, is T1, and the thickness as measured across the major surfaces of the upper and lower plates 21, 22 at mid portions of the main cartridge body unit 6 is T2, an amount of protrusion ΔT of the protrusion 37 of the intermediate frame 23 from the major surfaces of the upper and lower plates 21, 22 is set so that the following relationship $$\Delta T=(T1-T2)/2$$

$$T1 \geq T2$$

holds.

The bottom surface of the connection recess 38 is formed integrally with four substantially columnar-shaped engagement projections 41 engaged in the first to fourth engagement openings 31a to 31d and 32a to 32d formed in the upper plate 21 and in the lower plate 22, respectively. These engagement projections 41 are of such a height that, when the projections are engaged in the first to fourth engagement openings 31a to 31d and 32a to 32d, the distal ends of the engagement projections 41 are not protruded on the major surfaces of the upper and lower plates 21, 22.

Referring to FIG. 4, if the first engagement openings 31a, 32a of the upper plate 21 and the lower plate 22 is of a diameter Φ1, the second elliptically-shaped engagement openings 31b, 32b are both of diameters Φ1 and Φ2 and the third and fourth engagement openings 31c, 31d, 32c, 32d are of the diameter Φ2, and the respective engagement projections 41 of the intermediate frame 23 are of an outer diameter Φ3, the respective diameters are set so that Φ1>Φ3 and Φ2>Φ3. Meanwhile, a dimensional difference is set so that $$\Phi 1-\Phi 3=\beta \quad (2).$$

In the above equations 1 and 2, the dimensional differences are set so that α>β.

On the other hand, a dimensional difference is set so that Φ2−Φ3=2α.

By forming the first to fourth engagement openings 31a to 31d and 32a to 32d of the upper and lower plates 21, 22, and the engagement projections 41 of the intermediate frame 23, to the aforementioned dimensions, moving the second engagement openings 31b, 32b, engaged by the engagement projections 41, in a controlled fashion, with the first engagement openings 31a, 32a engaged by the engagement projections 41 as the reference, and by engaging the third and fourth engagement openings 31c, 31d, 32c, 32d by the engagement projections 41, it is possible to get the upper and lower plates 21, 22 mounted to high precision in position in the connecting recesses 38, 38. The upper and lower plates 21, 22 are bonded and secured to the intermediate frame 23 e.g., with an adhesive.

With the disc cartridge 1, in which the respective dimensions of the upper and lower plates 21, 22 and the intermediate frame 23 are set, as described above, it is possible to prevent deformation, such as warping, of the upper and lower plates 21, 22, or connection troubles, because account is taken sufficiently of the effect produced due to difference in thermal expansion or contraction coefficients between the upper and lower plates 21, 22 of metal and the intermediate frame 23 of synthetic resin under high or low temperature environments.

Within the intermediate frame 23, there is defined, by cutting out of the resin material, a substantially circular disc housing section 45 in which is rotationally accommodated the flexible magnetic disc 5. This disc housing section 45 is interrupted at a position in register with the recording and/or reproducing apertures 24, 25 of the upper and lower plates 21, 22, as shown in FIG. 7.

In the front end side of the intermediate frame 23, in register with the shutter sliding area through which slides the shutter member 61, there are formed steps 47, 47 for shutter movement which are inserted in a space between shutter portions 65, 65 of the shutter member 61 which will be explained substantially. The thickness of the intermediate frame 23 at the steps 47 for shutter movement is selected to be thinner than that within the connection recess 38.

There is formed a cut-out 49 on a front side corner of the intermediate frame 23, in register with the cut-outs 29, 30 of the upper and lower plates 21, 22, as shown in FIG. 7. The other corners of the intermediate frame 23 are arcuate in profile, as shown.

Referring to FIG. 7, a substantially vee-shaped engagement groove 50 is formed in the intermediate frame 23 at a position adjacent to the cut-out 49 and outwardly separated from the outer periphery of the upper and lower plates 21, 22 along the width of the main cartridge body unit 6. This engagement groove 50 is engaged by engagement means provided on the disc drive device at a pre-set loading position of the disc cartridge 1 when the disc cartridge is loaded on the disc drive device.

Figure 10:
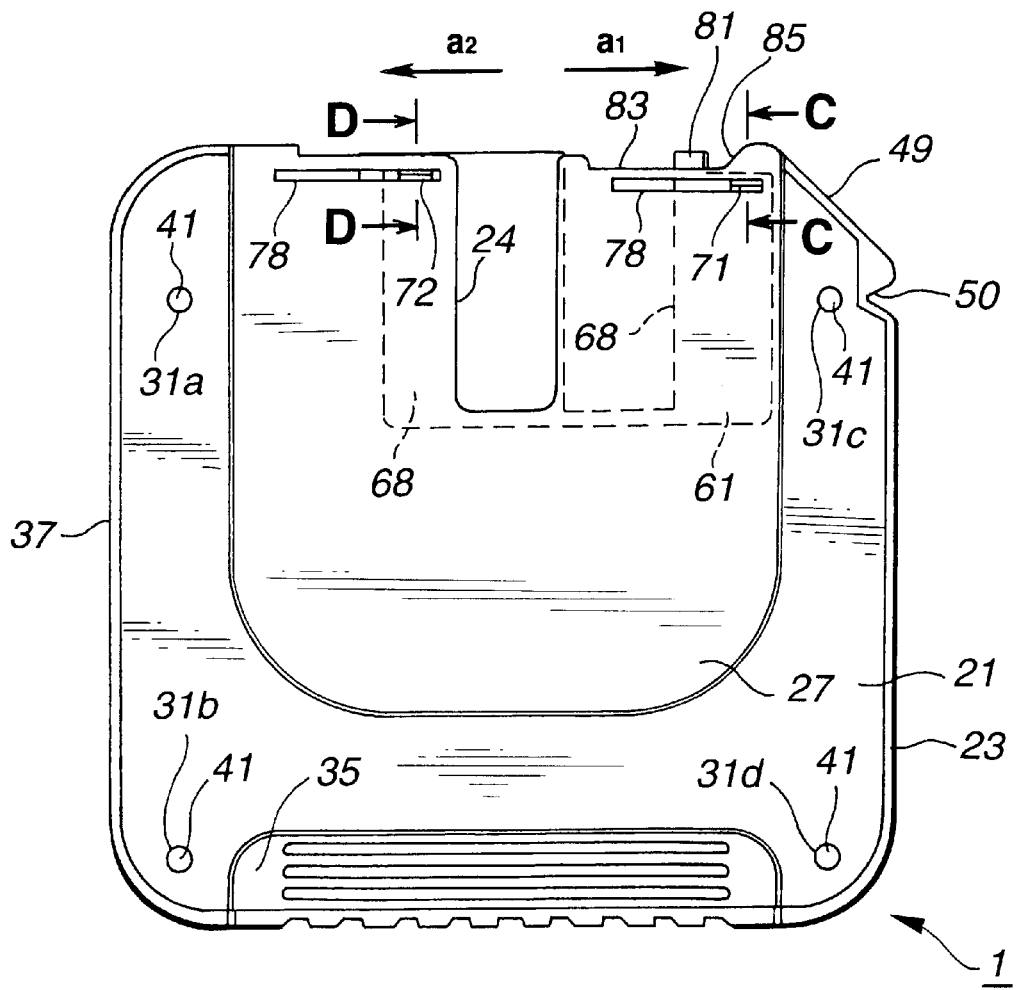
FIG. 10 is a plan view showing, from the side of the upper plate, a state in which the recording and/or reproducing aperture of the disc cartridge is closed.
Figure 11:
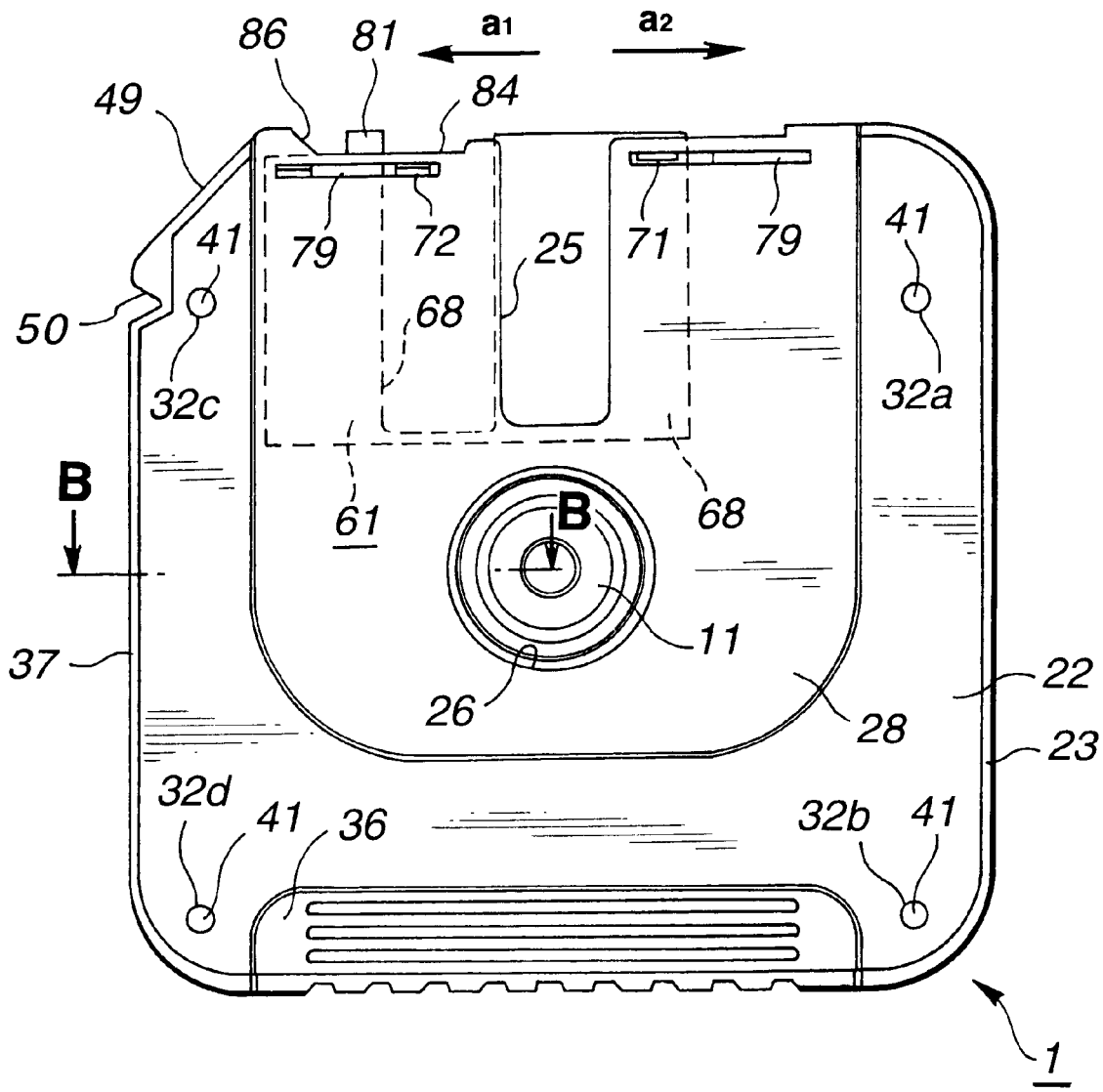
FIG. 11 is a plan view showing, from the side of the lower plate, a state in which the recording and/or reproducing aperture of the disc cartridge is closed.
Figure 12:
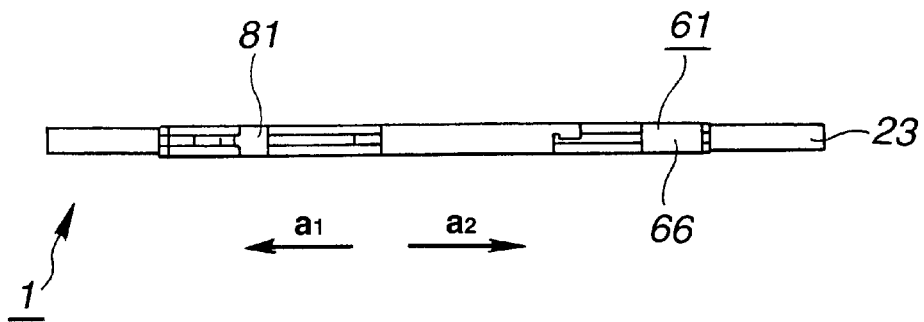
FIG. 12 is a side view showing, from the front end side of the main cartridge body unit, a state in which the recording and/or reproducing aperture of the disc cartridge is closed.

The main cartridge body unit 6 is provided with the shutter member 61, movable in the direction indicated by arrows $a_1$ and $a_2$, to enable the recording and/or reproducing apertures 24, 25 to be opened and closed, and a torsion coil spring 62, biasing the shutter member 61 in a direction of causing the shutter member 61 to close the recording and/or reproducing apertures 24, 25, as shown in FIGS. 10 to 12.

The shutter member 61 is formed of a relatively rigid metal material, and is of a substantially U-shaped cross-section, having a pair of parallel shutter portions 65, 65 facing each other, and a web 66 interconnecting the proximal ends of the shutter portions 65, 65, as shown in FIGS. 10 to 12. Meanwhile, the facing gap on the distal end sides of the shutter portions 65, 65 of the shutter member 61 is selected to be slightly larger than that at the proximal end. Since the shutter portions 65, 65 are substantially chevron-shaped, the distal ends of the shutter portions 65, 65 are prevented from compressing against the recording area of the flexible magnetic disc 5. The thickness of the shutter portions 65, 65 is selected to be approximately 0.15 mm.

Referring to FIGS. 12 to 15, the substantially rectangular apertures 68, 68 slightly larger than the recording and/or reproducing apertures 24, 25 are formed at registering positions to each other in the shutter portions 65, 65, with the apertures 68, 68 extending across the connecting web portion 66. That is, the respective apertures 68 of the shutter member 61 are opened towards the connecting web portion 66 of the shutter member 61. A magnetic head, not shown, of the disc drive device is moved parallel to the recording surface of the flexible magnetic disc 5 so as to be intruded into the recording and/or reproducing apertures 24, 25 from the opening side of the connecting web portion 66.

The shutter portions 65, 65 of the shutter member 61 are formed on both sides in the movement direction of the shutter portions 65, 65 integrally with first and second guide projections 71, 71, 72, 72, adjacent to the connecting web portion 66, these guide projections being movingly engaged with the upper and lower plates 21, 22, as shown in FIGS. 10 and 11. Since these first and second guide projections 71, 71, 72, 72 are formed by e.g., press working, so that portions 65, 65 will be protruded outwards, as shown in FIGS. 16 and 17, the distal ends of the guide projections 71, 71, 72, 72 are not sharp, thus assuring safety in case the user's finger end touches these distal ends.

Figure 16:
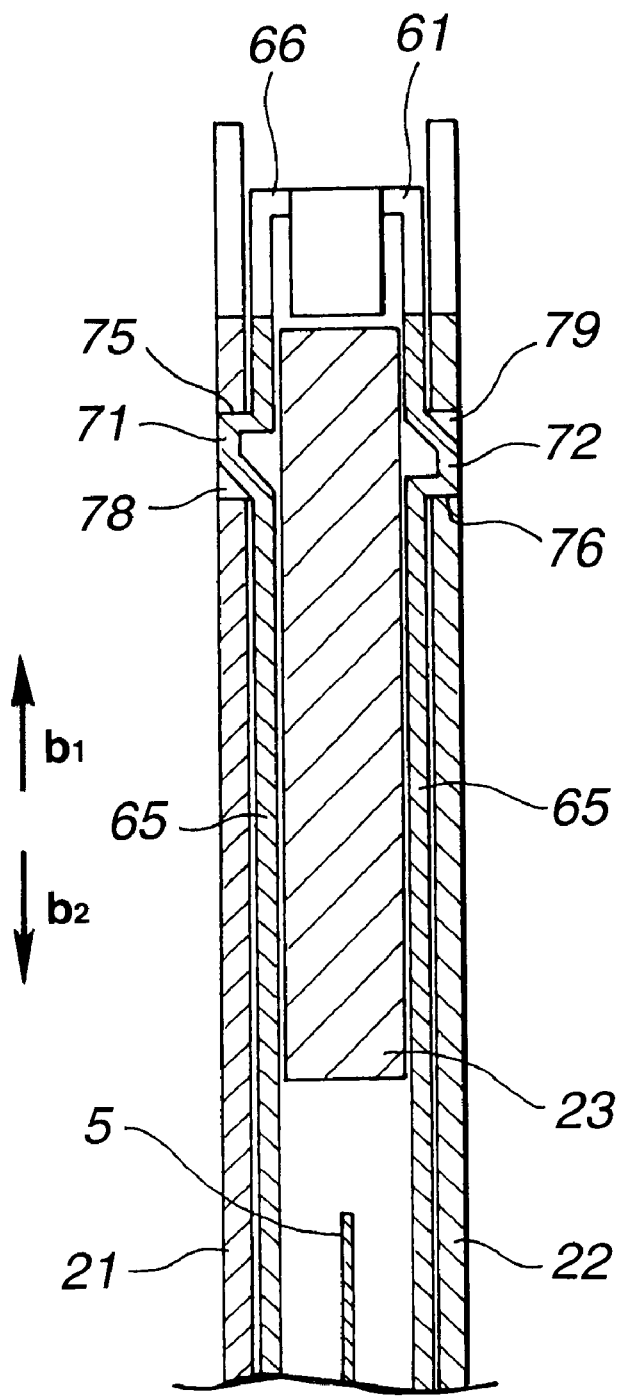
FIG. 16 is a cross-sectional view of a shutter member of FIG. 10, taken along line C—C in FIG. 10.
Figure 17:
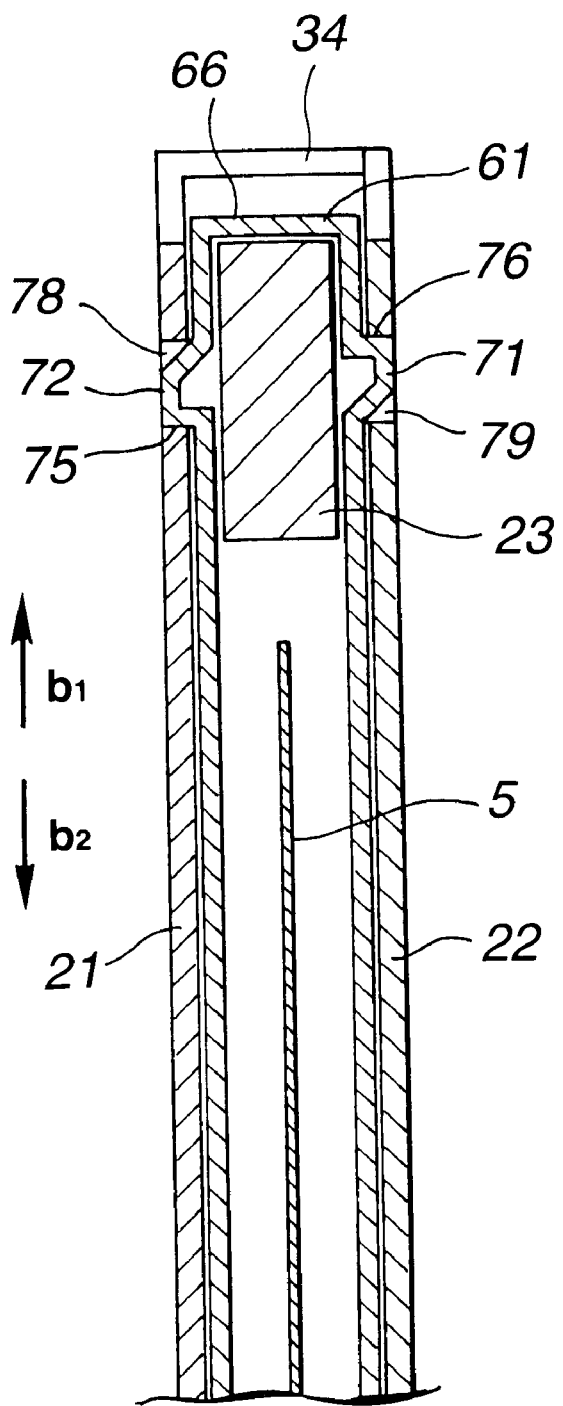
FIG. 17 is a cross-sectional view of a shutter member of FIG. 10, taken along line D—D in FIG. 10.

Referring to FIGS. 16 and 17, the first guide projections 71, 71 are formed towards the connecting web portion 66 integrally with first limiting surfaces 75 for extending substantially at right angles to the major surface of the shutter portions 65, 65. These first guide projections 71, 71 are engaged by the upper and lower plates 21, 22 to prevent the shutter member 61 from being disengaged by moving in the direction indicated by arrow $b_1$ in FIG. 16, that is towards the outer rim of the flexible magnetic disc 5. Referring further to FIGS. 16 and 17, the second guide projections 72, 72 are formed towards the distal ends of the shutter portions 65, 65 integrally with second limiting surfaces 76 for extending substantially at right angles to the major surface of the shutter portions 65, 65. These second guide projections 72, 72 are engaged by the upper and lower plates 21, 22 to prevent the shutter member 61 from being disengaged by moving in the direction indicated by arrow $b_2$ in FIG. 16, that is towards the inner rim of the flexible magnetic disc 5. As shown in FIGS. 16 and 17, these first and second guide projections 71, 71, 72, 72 are provided at facing positions of the shutter portions 65, 65 on both sides of the apertures 68 of the shutter portions 65,.

So, the shutter member 61 is prevented from being detached towards an outer side and towards the center of the main cartridge body unit 6 by the first and second guide projections 71, 71, 72, 72.

The guide projections 71, 72 lying on both sides of the aperture 68 of one of the shutter portions 65, 65 and the guide projections 71, 72 lying on both sides of the aperture 68 of the other shutter portion 65 are offset in their positions in a direction perpendicular to the moving direction of the shutter portions 65, 65, as shown in FIGS. 10 and 11.

On both sides of the recording and/or reproducing apertures 24, 25 in the thickened portions 27, 28 of the upper and lower plates 21, 22, linear guide slits 78, 78, 79, 79 are provided for extending along the front sides of the upper and lower plates 21, 22, as shown in FIGS. 4 and 5. Into these guide slits 78, 78, 79, 79 are movingly intruded the first and second guide projections 71, 71, 72, 72 of the shutter member 61.

The first and second guide projections 71, 72, intruded into these guide slits 78, 79, are flush with or slightly receded from the major surfaces of the upper and lower plates 21, 22, as shown in FIGS. 16 and 17. That is, the first and second guide projections 71, 72 are formed so that the distal ends thereof are not protruded outwards from the guide slits 78, 79, to assure safety of the finger end handling the disc cartridge 61.

The guide slits 78, 79 and the guide slits 78, 79 lying on both sides of the recording and/or reproducing apertures 24, 25 are provided at relatively offset positions in a direction perpendicular to the direction of movement of the shutter portions 65, 65.

The shutter member 61 is arranged so that the respective shutter portions 65, 65 are arranged between the inner surfaces of the upper and lower plates 21, 22 and the intermediate frame 23, and so that, by the first and second guide projections 71, 71, 72, 72 being introduced into the guide slits 78, 78, 79, 79 from the inner surfaces of the upper and lower plates 21, 22, the respective shutter portions 65, 65 are slidable linearly in the direction indicated by arrows $a_1$ and $a_2$ through the inside of the main cartridge body unit 6, as shown in FIGS. 16 and 17.

In the connecting web portion 66 of the shutter member 61 is formed an actuating portion 81, adjacent to the aperture 68 towards an end thereof in the moving direction of the shutter member 61, by segmenting a portion of the connecting web portion 66 and the portions of the shutter portions 65, 65 contiguous thereto, as shown in FIGS. 10 and 11. The actuating portion 81 is configured for being acted on by shutter operating means, not shown, provided on the disc drive device. This actuating portion 81 is formed integrally with an abutment piece, not shown, abutted on by the shutter operating means. The actuating portion 81 is formed at its one end in the moving direction of the shutter member 61 by folding a portion of the connecting web portion 66.

In the forward end sides of the upper and lower plates 21, 22 are formed cut-outs 83, 84 for moving the actuating portion 81 of the shutter member 61, as shown in FIGS. 4 and 5. From ends of the cut-outs 83, 84 are extended inclined guide portions 85, 86, continuing to the outer periphery, for guiding the shutter operating means provided on the disc drive device into the inside of the cut-outs 83, 84, as shown in FIGS. 4 and 5. In the forward end side of the intermediate frame 23, there is formed an operating cut-out 87 for moving the actuating portion 81 of the shutter member 61, in register with the cut-outs 83, 84 in the upper and lower plates 21, 22, as shown in FIG. 7. From an end of the cut-out 87 is extended an inclined guide portion 88, continuing to the outer periphery, for guiding the shutter operating means provided on the disc drive device into the inside of the cut-out 87, as shown in FIG. 7. The connecting web portion 66 of the shutter member 61 is formed integrally with a spring retainer 90 at its one end in the direction indicated by arrow $a_2$, as shown in FIGS. 2, 10 and 11. The spring retainer 90 is engaged by an end of the torsion coil spring 62.

The torsion coil spring 62 is provided at a forward corner of the main cartridge body unit 6, as shown in FIG. 2. The intermediate frame 23 is formed with a cut-out 92 in which to accommodate the torsion coil spring 62, as shown in FIG. 7. The inner peripheral surface of the cut-out 92 for mounting the spring therein is formed integrally with an engagement surface 93 engaged by the opposite end of the torsion coil spring 62. The torsion coil spring 62 has its one held by the spring retainer 90 of the shutter member 61, while having its opposite end engaged by an engagement surface 93 of the cut-out 92 of the intermediate frame 23 in which to accommodate the torsion coil spring 62.

Figure 13:
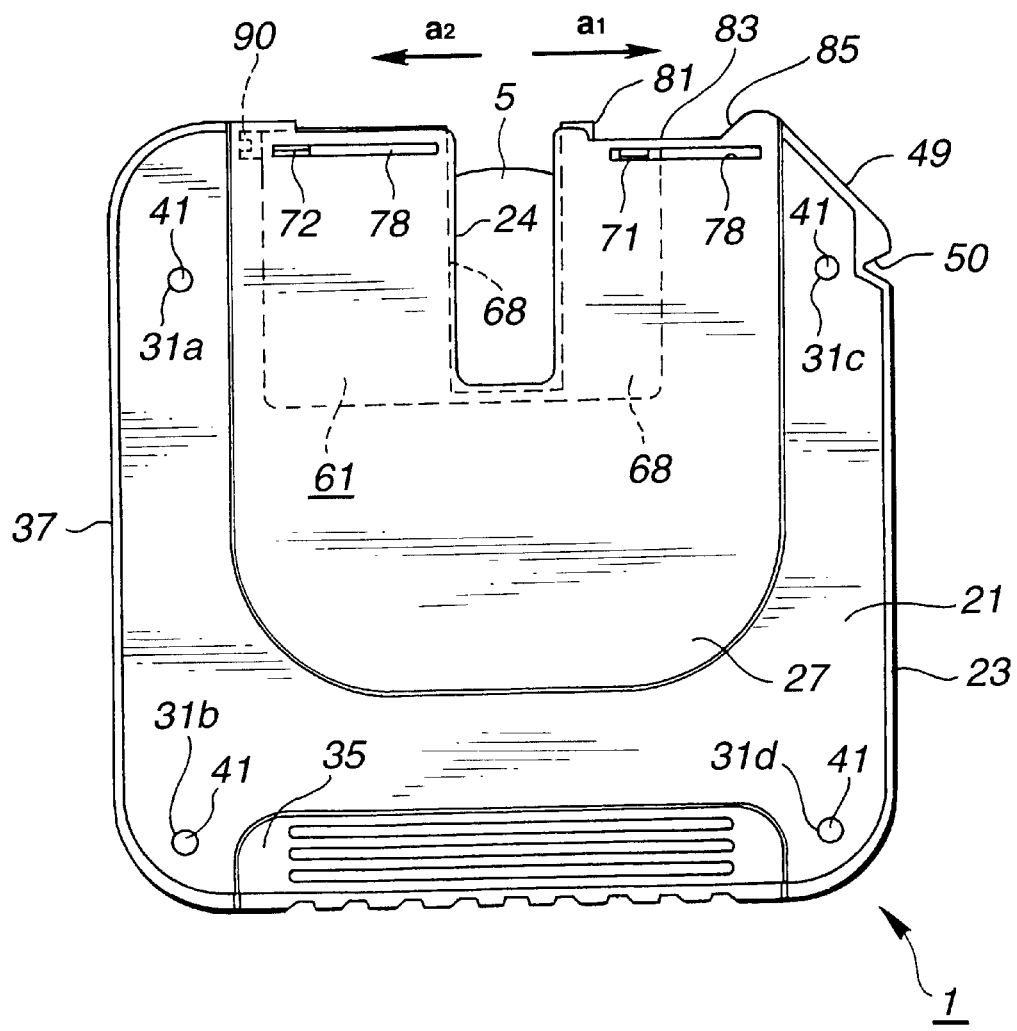
FIG. 13 is a plan view showing, from the side of the upper plate, a state in which the recording and/or reproducing aperture of the disc cartridge is opened.
Figure 14:
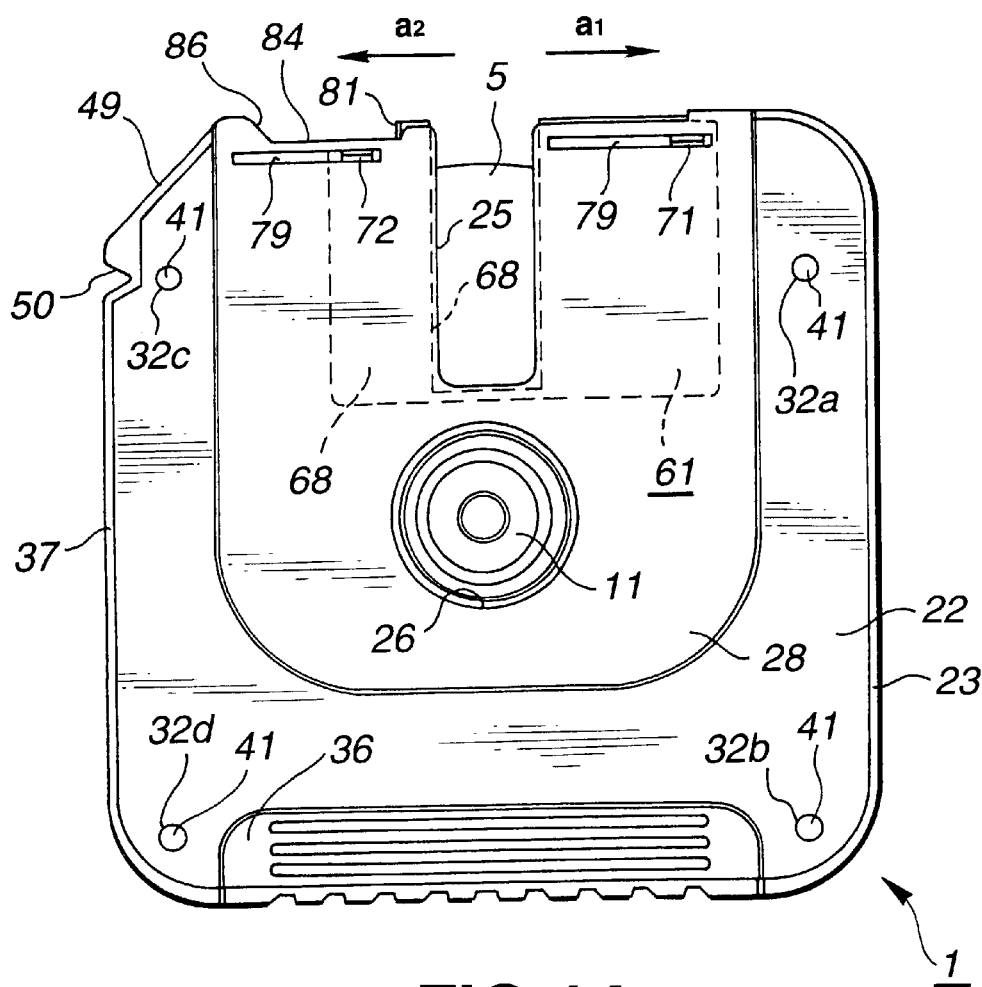
FIG. 14 is a plan view showing, from the side of the lower plate, a state in which the recording and/or reproducing aperture of the disc cartridge is opened.
Figure 15:
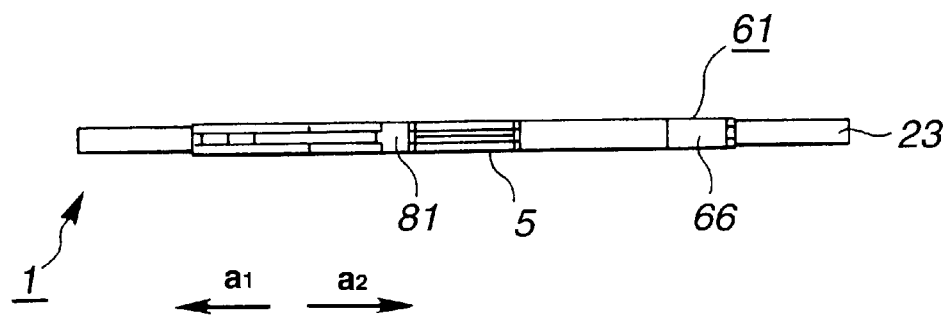
FIG. 15 is a side view showing, from the front end side of the main cartridge body unit, a state in which the recording and/or reproducing aperture of the disc cartridge is opened.

So, the shutter member 61 is biased in the direction indicated by arrow $a_1$ under the spring force of the torsion coil spring 62, so that the shutter member 61 has been moved to a position in which the apertures 68, 68 of the shutter portions 65, 65 are not in register with the recording and/or reproducing apertures 24, 25 of the upper and lower plates 21, 22, thus closing the recording and/or reproducing apertures 24, 25, as shown in FIGS. 10 to 12. On the other hand, the shutter member 61 is moved in the direction indicated by arrow $a_2$, against the force of the torsion coil spring 62, so that the shutter member 61 is moved to a position in which the apertures 68, 68 of the shutter portions 65, 65 are in register with the recording and/or reproducing apertures 24, 25 of the upper and lower plates 21, 22, thus opening the recording and/or reproducing apertures 24, 25, as shown in FIGS. 13 to 15.

Figure 21:
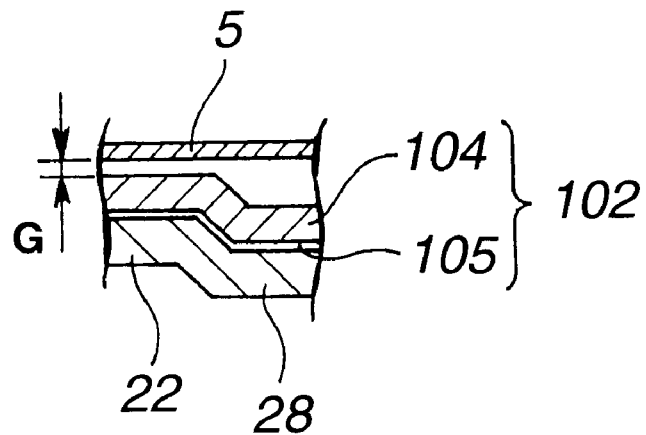
FIG. 21 is a cross-sectional view for illustrating the lower liner sheet in FIG. 19.
Figure 22:
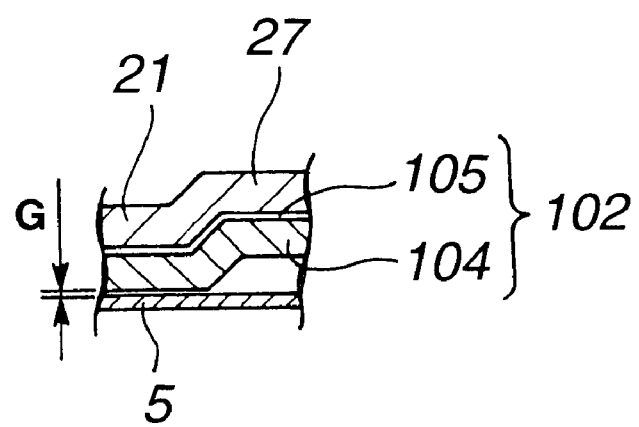
FIG. 22 is a cross-sectional view for illustrating the upper liner sheet in FIG. 20.

The main cartridge body unit 6 is provided with an upper liner sheet 101 and a lower liner sheet 102, adapted for protecting the recording surface of the flexible magnetic disc 5, as shown in FIGS. 2, 21 and 22. The upper and lower liner sheets 101, 102 are each comprised of a non-woven cloth layer 104 and a film-shaped laminated layer of resin 105, and are each formed as a disc of substantially the same diameter as the outer diameter of the flexible magnetic disc 5, as shown in FIGS. 21 and 22.

Figure 18:
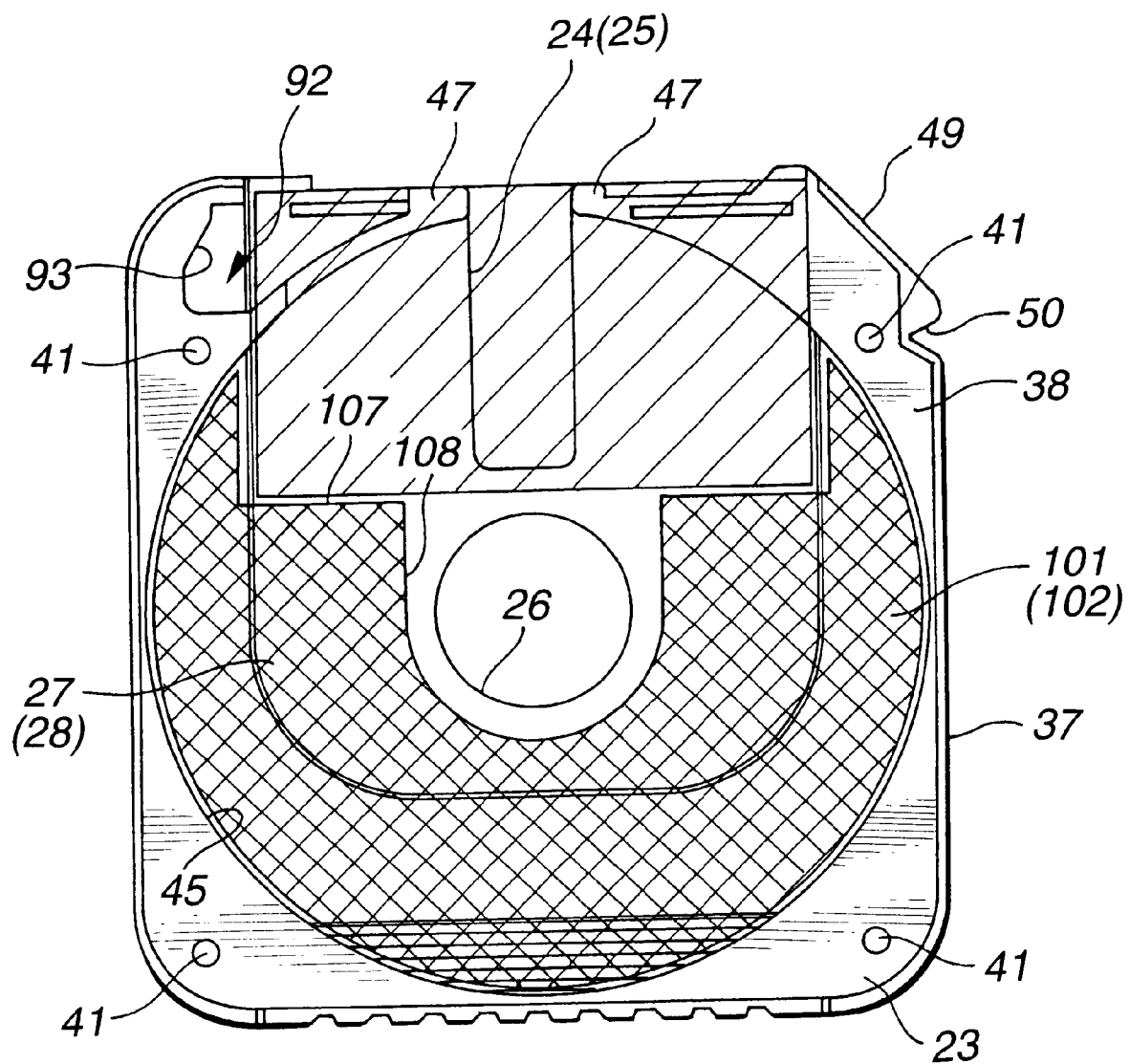
FIG. 18 is a plan view showing upper and lower liner sheets.

The upper and lower liner sheets 101, 102 is formed with a substantially rectangular first cut-out 107, roughly in register with the shutter slide area for the shutter member 61, shown by cross-hatching, and a substantially circular second center cut-out 108, larger in diameter than the rotationally driving opening 26 in the lower plate 22, and which is contiguous to the first cut-out 107, as shown in FIG. 18. These upper and lower liner sheets 101, 102 are bonded in position, as the upper and lower liner sheets 101, 102 are deformed along the thickened portions 27, 28, by setting a laminated layer 105 on the inner surfaces of the upper and lower plates 21, 22 and by welding the laminated layer 105 to the inner surfaces o the upper and lower plates 21, 22.

Figure 19:
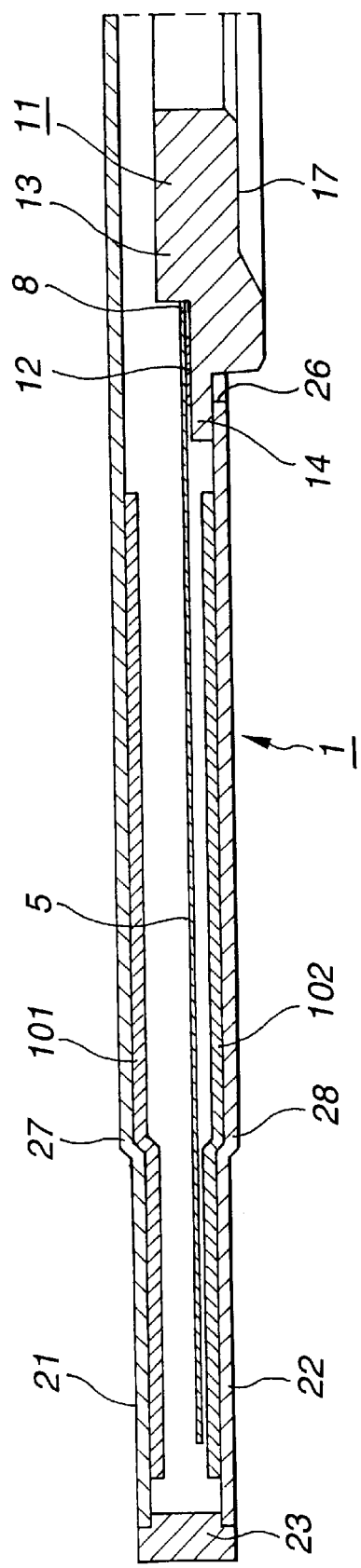
FIG. 19 is a cross-sectional view, taken along line B—B, for illustrating the state in which the flexible magnetic disc has been moved towards the lower plate.

During handling, the flexible magnetic disc 5 of the disc cartridge 1 is moved in a direction of approaching to the lower plate 22, so that the flange 14 of the center hub 11 rests on the inner surface of the lower plate 22, as shown in FIG. 19. Alternatively, the flexible magnetic disc 5 of the disc cartridge 1 is moved in a direction of approaching to the upper plate 21, so that the mid portion 13 of the center hub 11 compresses against the inner surface of the upper plate 21, as shown in FIG. 20.

The lower liner sheet 102 is of a pre-set thickness, such that, with the flexible magnetic disc 5 moved towards the lower plate 22, at least a small gap G persists between the flexible magnetic disc 5 approaching to the lower liner sheet 102 and the lower liner sheet 102, as shown in FIGS. 19 and 21. Thus, the flexible magnetic disc 5, approaching to the lower plate 22, is positively prohibited from damaging the recording surface by being deformed upwards by an edge of the lower plate 22 deformed along the thickened portion 28 of the lower plate 22, as shown in FIG. 21.

Figure 20:
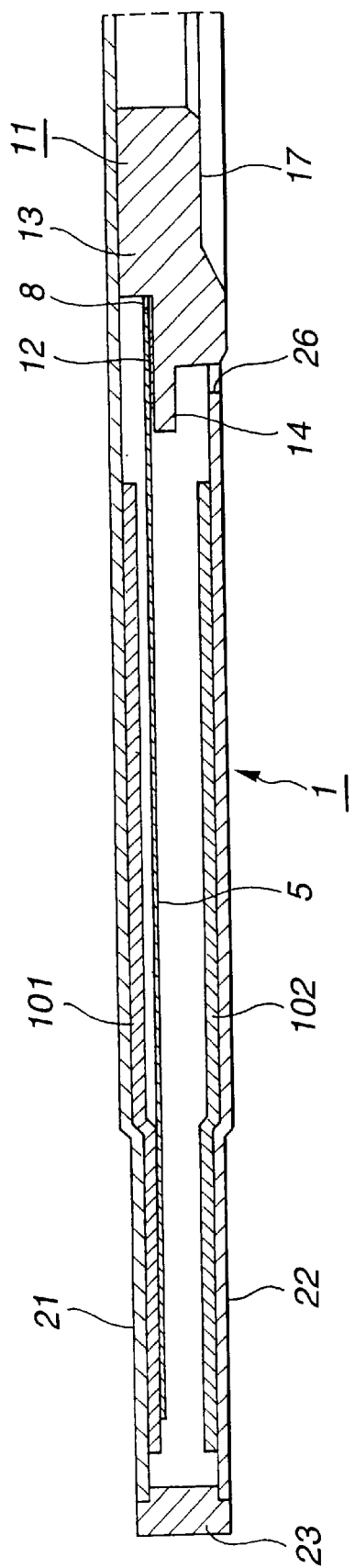
FIG. 20 is a cross-sectional view, taken along line B—B, for illustrating the state in which the flexible magnetic disc has been moved towards the upper plate.

The upper liner sheet 101 is similarly of a pre-set thickness, such that, with the flexible magnetic disc 5 moved towards the upper plate 21, at least a small gap G persists between the flexible magnetic disc 5 approaching to the upper liner sheet 101 and the upper liner sheet 101, as shown in FIGS. 20 and 22. Thus, the flexible magnetic disc 5, approaching to the upper plate 21, is positively prohibited from damaging the recording surface by being deformed upwards by an edge of the upper plate 21 deformed along the thickened portion 27 of the upper plate 21, as shown in FIG. 22.

The upper and lower liner sheets 101, 102 are each provided with a non-woven cloth layer 104 and a laminated layer of resin 105. Alternatively, the upper and lower liner sheets 101, 102 may each be comprised of an ultra high molecular polyethylene sheet or a lubricious sheet, coated or impregnated with a lubricious material, such as fluorine or silicon.

An example of a fluorine-containing sheet is a polytetrafluoroethylene (Teflon) sheet.

Figure 23:
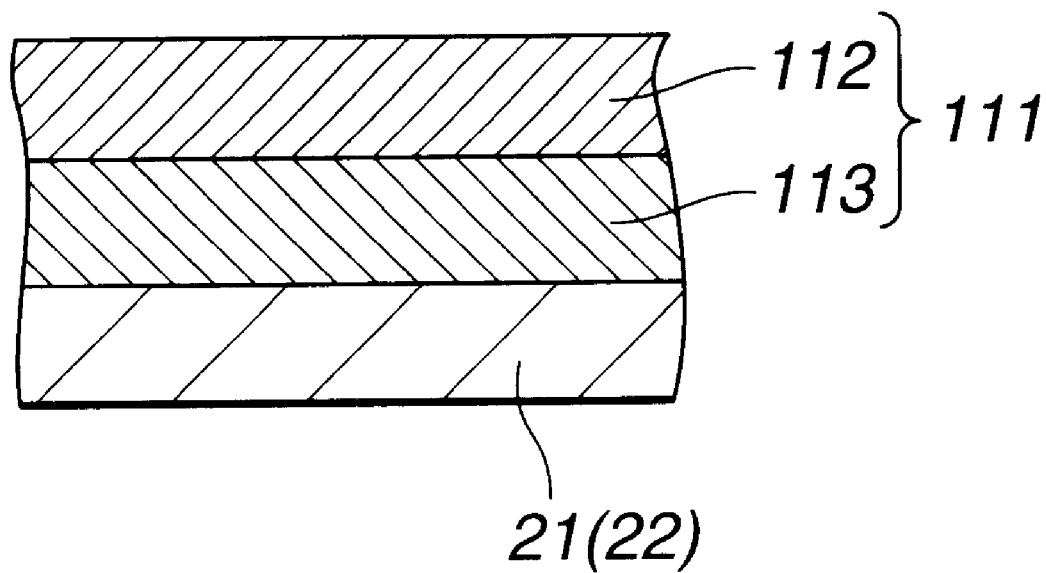
FIG. 23 is a cross-sectional view for illustrating a lubricious sheet.

Referring to FIG. 23, this lubricious sheet 111 includes a lubricious layer 112, containing a lubricious material, positioned facing the recording surface of the flexible magnetic disc 5, and an adhesive layer 113 bonded to the inner surface of the upper plate 21 or the lower plate 22. A set of the lubricious sheets 111, 111 are bonded to the inner surfaces of the upper and lower plates 21, 22 via adhesive layers 113.

The adhesive layer may, for example, be of an acrylic double-sided adhesive or an adhesive such as ethylene vinyl acetate.

By employing the lubricious sheets 111, 111 as the upper and lower liner sheets, the sheet thickness can be reduced as compared to that of a sheet structure comprising the non-woven cloth layer 104 and the laminate layer 105 as described above, with the result that a sufficient gap between the flexible magnetic disc and the upper and lower liner sheets may be realized to enable further reduction in thickness of the main cartridge body unit.

Figure 24:
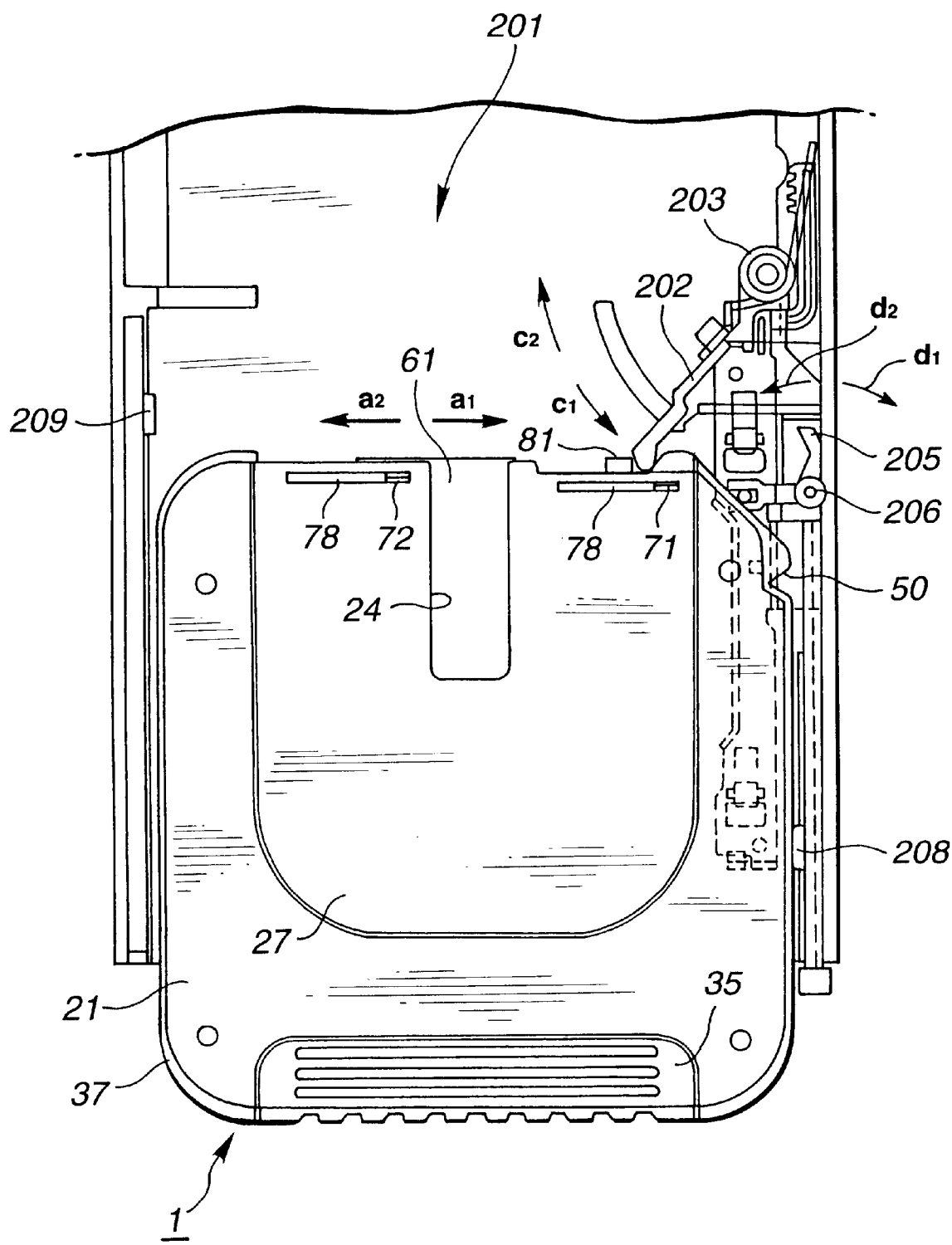
FIG. 24 is a plan view for illustrating the state in which shutter operating arm of a disc drive device bears against the shutter member of the disc cartridge.

The disc drive device, in which is loaded the above-described disc cartridge 1, as described above, includes a cartridge loading unit 201 in which to load the disc cartridge 1, and a shutter operating arm 202 for opening the shutter member 61 of the inserted disc cartridge 1, as shown in FIG. 24. The shutter operating arm 202 is provided at a forward side corner of the disc cartridge 1 to be inserted in the disc drive device so that the shutter operating arm 202 is rotatable via a rotary pivot 203 in the direction indicated by arrows $c_1$ and $c_2$.

The disc drive device is also provided at a pre-set position in the cartridge loading unit 201 with a lock arm 205 by a rotary pivot 206 for rotation in the direction indicated by arrows d1 and d2. The lock arm 205 is adapted for locking the intruded disc cartridge in position. The disc drive device is also provided in the cartridge loading unit 201 with positioning pieces 208, 209 facing both lateral surfaces running parallel to the inserting/ejecting directions of the disc cartridge 1, as shown in FIG. 24.

The operation of loading the above-described disc cartridge 1 in the disc drive device to record and/or reproduce the information on or from the flexible magnetic disc 5 is hereinafter explained with reference to the drawings. When intruded into the inside of the disc drive device, the disc cartridge 1 has its intruding direction restricted by abutment against a positioning piece 208, as shown in FIG. 24. Simultaneously, the distal end of a shutter actuating arm 202 compresses against the actuating portion 81 of the shutter member 61.

Figure 25:
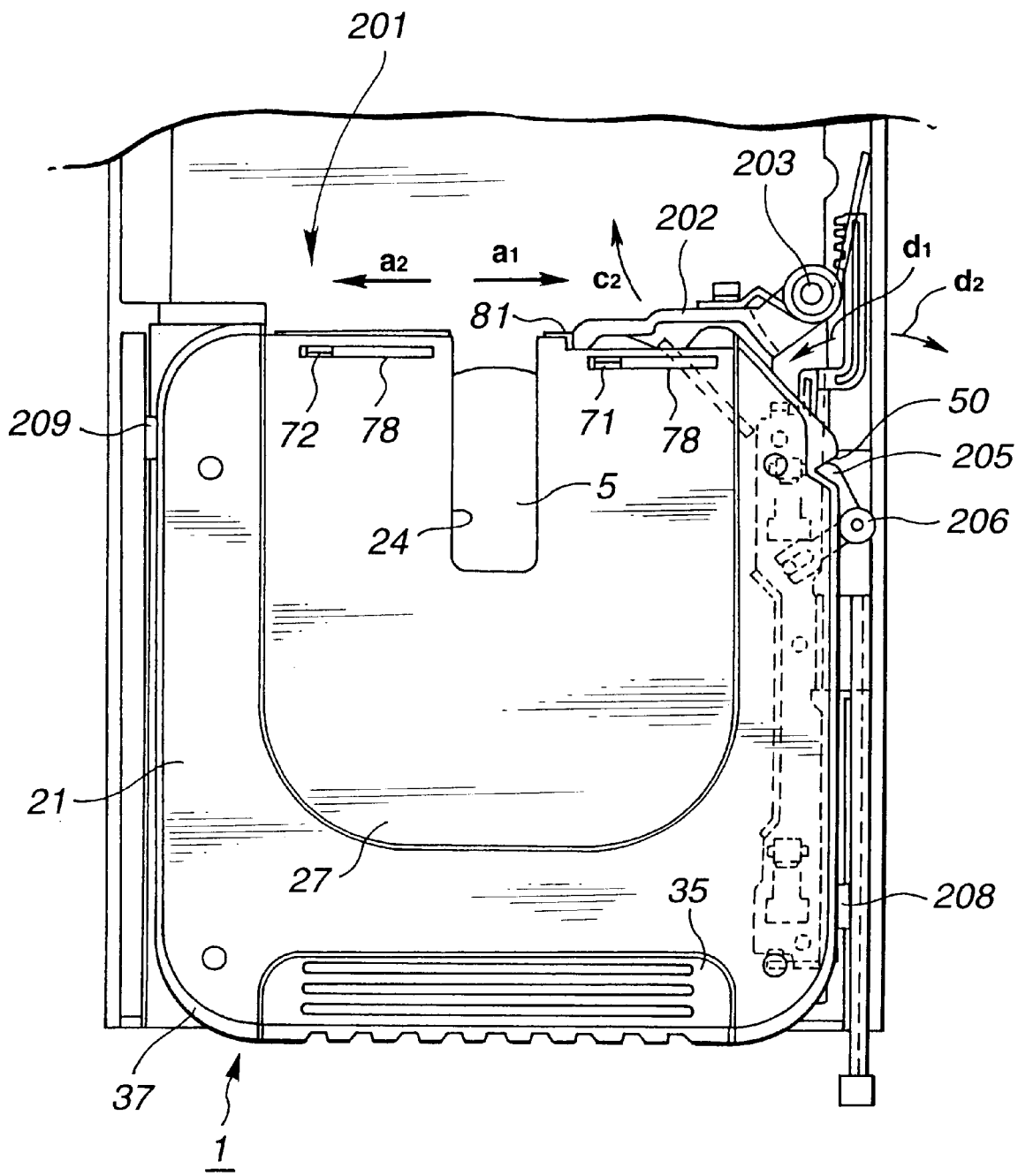
FIG. 25 is a plan view showing the state in which the shutter member of the disc cartridge has been opened by the shutter operating arm of a disc drive device.

As the disc cartridge 1 is loaded on the cartridge loading unit 201 of the disc drive device, the shutter actuating arm 202 is rotated in the direction indicated by arrow $c_2$ in FIG. 25 to cause movement of the shutter member 61 in the direction indicated by arrow $a_2$ to open the recording and/or reproducing apertures 24, 25, as shown in FIG. 25. When the disc cartridge 1 is loaded on the cartridge loading unit 201, the positioning pieces 208, 209 compress against the lateral sides in the inserting/ejecting direction, at the same time as the lock arm 205 is rotated in the direction indicated by arrow d2, such that the lock arm 205 has its distal end engaged in the engagement groove 50 on the lateral sides of the main cartridge body unit 6, as shown in FIG. 25. The disc cartridge is pulled to a pre-set loading position in the cartridge loading unit 201 by the lock arm 205 engaged in the engagement groove 50, so as to be locked in position, as shown in FIG. 25.

With the disc cartridge 1, the flexible magnetic disc 5 set on the disc table 9 is run in rotation, whilst the magnetic head is intruded into the recording and/or reproducing apertures 24, 25 from the apertures 68, 68 in the shutter member 61 to record and/or reproduce the information on or from the flexible magnetic disc 5.

With the above-described disc cartridge, comprised of the main cartridge body unit, made up of the upper and lower plates 21, 22 formed of a metal material and the intermediate frame 23 bonded in position between the upper and lower plates 21, 22, the upper plate 21 can be easily connected to the lower plate 22. With this disc cartridge 1, the main cartridge body unit 6 can be reduced in size and thickness without deteriorating the appearance or structural integrity of the main cartridge body unit 6.

With the disc cartridge 1, in which the upper liner sheet 101 and the lower liner sheet 102 are welded via the laminate layer 105 to the inner surfaces of the upper plate 21 and the lower plate 22 of metal, the upper and lower liner sheets 101, 102 can be provided readily to the main cartridge body unit 6 thus positively protecting the flexible magnetic disc 5. Moreover, with the disc cartridge 1, in which the lubricious sheets 11, 11 are bonded via adhesive layers 113 to the inner surfaces of the upper and lower plates 21, 22 of metal, the lubricious sheets 11, 11 can be provided readily to the main cartridge body unit 6 thus positively protecting the flexible magnetic disc 5.

Moreover, with the disc cartridge 1, in which the upper plate 21 and the lower plate 22 are provided on the major surface of the main cartridge body unit 6, it is possible to suppress the powder debris produced on abrasion of the metallic upper and lower plates 21, 22, so that adverse effects ascribable to powder debris can be inhibited to improve reliability in the recording and/or reproducing operation.

Also, in the disc cartridge 1, the portions of the main cartridge body unit 6 other than the thickened portions 27, 28 are formed to a uniform thin thickness to render it possible to stabilize the rotational operation of the flexible magnetic disc 5.

In addition, in the disc cartridge 1, in which the intermediate frame 23 is formed of a resin material, the intermediate frame 23 can be bonded easily to the upper plate 21 and the lower plate 22 to improve the assembling performance. In the present disc cartridge, the protrusion 37 of the intermediate frame 23 is provided on the outer rim of the main cartridge body unit 6 so that there is no risk of edges of the upper and lower plates 21, 22 projecting from the intermediate frame 23 of resin, thus assuring sufficient safety in handling.

The disc cartridge 1 has the shutter member 61 sliding linearly within the inside of the main cartridge body unit 6, whereby the supporting structure for the shutter member 61 can be simplified. Moreover, when the disc cartridge is intruded into or ejected from the disc drive device, the shutter member 61 may be prevented from compressing against the cartridge inserting/ejecting opening provided on the disc drive device, whilst the shutter member 61 may be reliably prohibited from sliding against a door rotatably mounted on the cartridge inserting/ejecting opening. Thus, with the present disc cartridge 1, it is possible to prevent the shutter member 61 from being destructed as well as to improve operability in inserting/ejecting the disc cartridge 1 to or from the disc drive device.

Although the disc cartridges 1, 2 according to the present invention are configured for housing the flexible magnetic disc 5 therein as a disc-shaped recording medium, it is to be noted that the disc-shaped recording medium may be of other types, such as a magneto-optical disc.

What is claimed is:

1. A disc cartridge comprising:

a disc-shaped recording medium;

a main cartridge body unit including an upper plate and a lower plate, both of a metal material, forming a plate pair, and an intermediate frame, sandwiched between the upper and lower plates, said main cartridge body unit housing said disc-shaped recording medium therein wherein each of said upper and lower plates include an edge deformed along a thickened portion;

a set of protective sheet liner members including a non-woven cloth layer facing the disc-shaped recording medium and a film-shaped laminated layer of resin bonded respectively to inner surfaces of said upper and lower plates for protecting said disc-shaped recording medium; and whereby said liner members are of a pre-set thickness such that a small gap exists between the disc-shaped recording medium and the liner members as the disc-shaped recording medium is moved toward the plates so that the disc-shaped recording medium approaching the upper and lower plates are prohibited from damaging the recording surface by being deformed by the edge of the upper and lower plates.

2. The disc cartridge according to claim 1 wherein said disc cartridge includes a recording and/or reproducing aperture formed in said main cartridge body unit for exposing a portion of a recording area of said disc-shaped recording medium to outside across the inner and outer rims of the disc-shaped recording medium and a shutter member provided inwardly of said main cartridge body unit for opening/closing said recording and/or reproducing aperture;

said protective members each having a cut-out in register with an area of movement of said shutter member.

3. A disc cartridge comprising:

a disc-shaped recording medium;

a main cartridge body unit including an upper plate and a lower plate, both of a metal material, forming a plate pair, and an intermediate frame, sandwiched between the upper and lower plates, said main cartridge body unit housing said disc-shaped recording medium therein; and a set of sheet-shaped protective members bonded to inner surfaces of said upper and lower plates for protecting said disc-shaped recording medium, wherein said protective members are each made up of a lubricious layer of a lubricious material on a facing side to said disc-shaped recording medium and adhesive layers bonded to said upper plate and said lower plate and wherein said lubricious layer of said protective member contains fluorine or silicon.

4. The disc cartridge according to claim 3 wherein said lubricious layer contains polytetrafluoroethylene.

5. A disc cartridge comprising:

a disc-shaped recording medium;

a main cartridge body unit including an upper plate and a lower plate, both of a metal material, forming a plate pair, and an intermediate frame, sandwiched between the upper and lower plates, said main cartridge body unit housing said disc-shaped recording medium therein; and a set of sheet-shaped protective members bonded to inner surfaces of said upper and lower plates for protecting said disc-shaped recording medium wherein said protective members are each made up of a lubricious layer of a lubricious material on a facing side to said disc-shaped recording medium and adhesive layers bonded to said upper plate and said lower plate and wherein said lubricious layer of said protective member contains high molecular polyethylene.

* * * * *